No. 687,330. Patented Nov. 26, 1901.
A. W. McCURDY.
INDICATOR FOR CAMERAS.
(Application filed May 29, 1901.)
(No Model.)
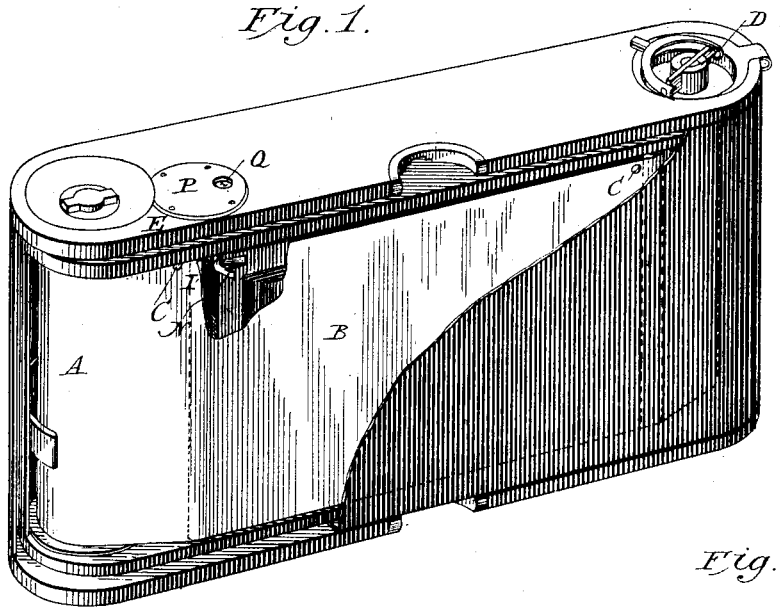
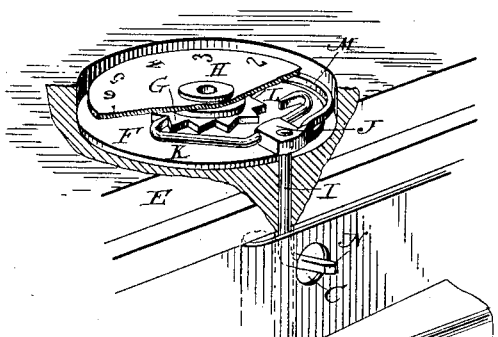
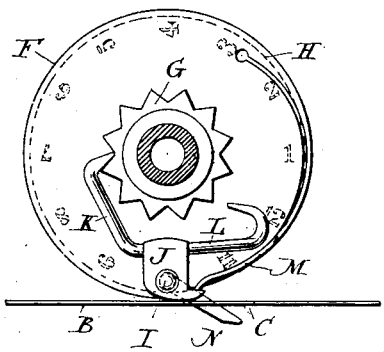
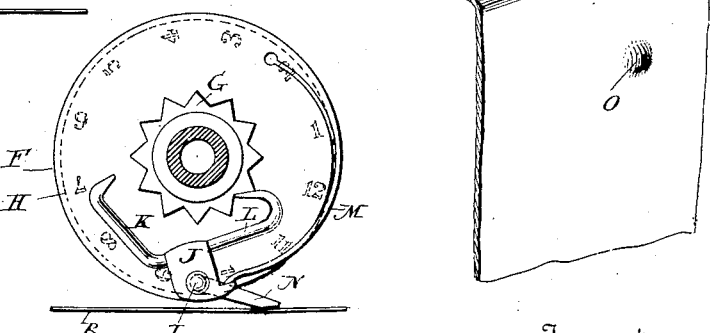

UNITED STATES PATENT OFFICE.

ARTHUR WILLIAMS McCURDY, OF WASHINGTON, DISTRICT OF COLUMBIA.

INDICATOR FOR CAMERAS.

SPECIFICATION forming part of Letters Patent No. 687,330, dated November 26, 1901.

Application filed May 29, 1901. Serial No. 62,707. (No model.)

*To all whom it may concern:*

Be it known that I, ARTHUR WILLIAMS MC-CURDY, a subject of the King of Great Britain and Ireland, residing at Washington, in the District of Columbia, have invented certain new and useful Improvements in Indicators for Cameras, of which the following is a specification.

My present invention relates to improvements in indicators for cameras, the construction and advantages of which will be hereinafter set forth, reference being had to the annexed drawings, wherein—

Figure 1 is a perspective view of a camera, having the back thereof removed and showing my improved indicator applied thereto; Fig. 2, an enlarged perspective view of the indicator and a portion of the camera and film; Fig. 3, a top plan view of the operative portions, showing the operating finger or lever as bearing on the film; and Fig. 4, a similar view, the finger being illustrated as having passed into an opening in the film and the ratchet-wheel moved forward a step.

The object of my present invention is to provide a register or indicator which may be readily applied to any camera, and more particularly to that class wherein a thin back of aluminium or the like is employed.

A further object of the invention is to so arrange the device that the end of the operating arm or lever will bear upon the sensitized face of the film, and consequently act to force the film, if it is, in fact, moved at all, toward the back of the camera. The back being, in the form of camera illustrated, close up to the film, there is of course no tendency on the part of the actuating-arm to throw the film out of the focal plane. Moreover, the lever is preferably located near one end of the exposure-opening, or near the guide or roll over which the film passes. Again, as will be hereinafter pointed out, the perforations in the film are so positioned that when the lever moves therethrough, and thereby actuates the indicator, the film will be in its proper position for exposure. This, of course, is not absolutely essential, but is incident to the location and arrangement of the parts shown in the drawings.

With cameras of the form illustrated, wherein a thin back is used, it is impossible without forming a projection thereon, which is objectionable, to locate the register on or in the back. The present construction does away with this difficulty.

In the drawings there is illustrated a camera provided with a supply-roll A, from which a film B, provided with a series of perforations C near one edge thereof, passes to a winding roll D. The perforations are so placed that each will occupy a position intermediate the exposure-spaces on the film, as will be readily understood by those skilled in the art.

In or on top of the camera and near one of the film supports or guides E there is secured a plate F, preferably of some spring metal, such as spring-brass. A ratchet or escapement wheel G is pivoted to said plate, and over said wheel and fixed so as to rotate therewith is a disk or dial H, having a series of notations thereon, as best shown in Fig. 2. Extending through plate F and through the top or upper side of the camera-framing is an arbor or shaft I, carrying at its upper end a block J, to which in turn is attached a pallet, the arms K and L of which lie in the same plane as the wheel G and alternately engage said wheel. A spring M, preferably formed integral with, as shown, or as a part of plate F, bears upon block J and normally tends to keep pallet-arm K in engagement with the wheel. An arm N extends out from the lower end of the shaft I at right angles thereto, said arm by preference being formed by making the shaft too long and bending the lower end outwardly, as shown in Fig. 2. Normally, or when the film is properly positioned for an exposure, the end of arm N extends through an opening in the film, and ordinarily provision will be made to permit the outer end of said arm to pass into a recess in the camera-back. If the back be a metallic one, as in the form illustrated, the recess may be made by simply pressing out a portion, as at O, directly opposite the arm.

To shield disk or dial H and permit only one figure or notation thereon to be viewed at a time, a cover or cap-piece P is provided, said cover having a protected opening Q in line with the figures on the dial.

If, as illustrated, the indicator be recessed into the camera-body, there is little or no projecting surface, though, if desired, the whole mechanism may be arranged upon the exterior of the case, in which event it is simply necessary in applying it to any camera to bore or drill a hole for the reception of shaft or spindle I.

The operation of the device is obvious. As the film is wound upon roll D it is caused to pass over and into contact with arm N, forcing said arm back into the position shown in Fig. 3 against the tension or action of spring M. Pallet-arm L will then be in engagement with wheel G and will have moved said wheel such a distance that arm K will act when it is thrown around through the action of the spring. This takes place when one of the openings C in the film comes opposite arm N, said arm passing through the opening and the parts assuming the position shown in Fig. 4. Arm K will have caused the wheel to turn a distance sufficient to bring one of the notations carried by the disk beneath opening Q in the cover, thus showing that the film is in proper position for exposure and also giving the number of the particular exposure. As the film is moved on, arm N rides out of the opening, and in so doing the spring is put under tension, pallet-arm K withdrawn from the wheel, and pallet-arm L forced into engagement therewith, moving the wheel so that it will again be in position for engagement with arm K. The notations on the dial are so proportioned and arranged that no indication is made by the movement of the wheel when actuated by arm L. Thus it will be seen that as the film is moved along the proper position for each exposure will be indicated and each exposure noted.

Having thus described my invention, what I claim is—

1. In a camera, the combination of a main body portion; a back; means for feeding a film between said back and the body portion; and an indicator carried by the body portion, having its actuating-arm arranged to bear on the sensitized face of the film, and moving toward the back of the camera across the path of travel of the film to actuate the indicator.

2. In a camera, the combination of a main body portion; a rotary indicator carried thereby and having its axis in a plane substantially parallel to the path of travel of the film; means for advancing a perforated film; and an actuating-arm for the indicator, said arm bearing on the sensitized face of the film and actuating the indicator as the arm passes toward the back of the camera through a perforation in the film.

3. In combination with a camera, a rotary indicator carried by one side thereof; an actuating-shaft extending through said side; and an arm extending from said shaft out into the path of travel of the film and serving to actuate the indicator as the arm passes toward the back of the camera through a perforation in the film.

4. In combination with a camera, a rotary indicator mounted thereon; an actuating-shaft therefor; and an actuating-arm connected to the shaft, said arm extending across the path of travel of the film toward the back of the camera and adjacent to one of the film-supports, whereby the film will be maintained in its proper focal plane notwithstanding the pressure of the arm thereon.

5. In combination with a camera, a toothed wheel mounted thereon; a pallet working in conjunction with said wheel; a spring for moving said pallet in one direction; and an arm extending out into the path of travel of the film, said arm moving the pallet in opposition to the spring as the arm is forced back by the film.

6. In combination with a camera, a toothed wheel rotatably mounted thereon; an indicating-disk carried by said wheel; a pallet working in conjunction with said wheel; a spring for moving the pallet in one direction; a shaft connected to said pallet; and an arm connected to said shaft, said arm extending out into the path of travel of the film, substantially as described.

7. In combination with a camera, a plate F secured thereto, and having a spring M formed integral therewith; a toothed wheel rotatably mounted on said plate; an indicating-disk carried by said wheel; a block J having pallet-arms K, L, connected thereto; a shaft I extending down through the camera-casing; and an arm N extending out from the lower end of the shaft across the path of travel of the film.

8. In an indicator for a camera, the combination of a toothed wheel; a pallet for actuating the wheel; a spring for throwing the pallet in one direction; and an arm extending out into the path of travel of the film toward the camera-back for actuating the pallet in the opposite direction.

9. In a camera, the combination of the main body portion; a back; means for feeding a perforated film between the back and the body portion; and an indicator carried by said body portion and acting toward the back of the camera across the path of travel of the film.

10. In combination with means for supporting and advancing a perforated film; an indicating device; a shaft for actuating said indicating device; and a lever connected to the shaft, said lever standing at approximately right angles to the axis of the shaft and extending out into the path of travel of the film, substantially as described.

11. In combination with means for supporting and advancing a perforated film; an indicating device; a shaft for actuating said indicating device; a lever connected to the shaft, said lever standing at approximately right angles to the axis of the shaft and extending out into the path of travel of the film; and a spring arranged to rock the shaft and force the lever through a perforation in the film as said perforation comes in line with the lever, thereby bringing the exposure-number on the indicator to view.

In testimony whereof I have signed my name to this specification in the presence of two subscribing witnesses.

ARTHUR WILLIAMS McCURDY.

Witnesses:
HAROLD E. ATWATER,
H. PERCY BLANCHARD.